Sept. 14, 1943.  E. H. LAND  2,329,543
DESIGN IN POLARIZING MATERIAL AND METHOD OF MANUFACTURING SAME
Filed May 20, 1938

POLAROID FILM

INVENTOR.
Edwin H. Land
BY
Brown & Jones
ATTORNEYS

Patented Sept. 14, 1943

2,329,543

UNITED STATES PATENT OFFICE 2,329,543

DESIGN IN POLARIZING MATERIAL AND METHOD OF MANUFACTURING SAME

Edwin H. Land, Wellesley Farms, Mass., assignor, by mesne assignments, to Polaroid Corporation, Dover, Del., a corporation of Delaware Application May 20, 1938, Serial No. 209,060

21 Claims. (Cl. 88—65)

This invention relates to a new and improved method of producing prints, pictures, designs and the like, and to the product thereof.

An object of the invention is to provide a method and product of the character described wherein a print, picture or design is produced in light-polarizing material.

Further objects of the invention are the provision of a process of the character described comprising the formation of a print, picture, design or the like in a polarizing surface by the destruction or predetermined alteration of the polarizing properties of predetermined areas of said surface; the production of such an image or the like through the destruction or alteration of the polarizing properties of the surface by the application thereto of a chemical or other substance destructive of the polarizing properties thereof; the use of radiation of a character adapted to destroy or alter the polarizing properties of the surface; the physical removal, as for example by cutting away or scraping away, of portions of the polarizing surface; the control, during the formation thereof, of the polarizing properties of predetermined areas in a polarizing surface; and the formation of a print, image or the like in light-polarizing material by depositing polarizing material upon a support so as to cover predetermined areas thereof only.

Other objects of the invention are the production of a print, image, design or the like in polarizing material wherein the design or print or the like is formed by polarizing material, or is formed by the provision of non-polarizing areas in a polarizing surface.

Other objects of the invention will in part be obvious and will in part appear hereinafter.

The invention accordingly comprises the several steps and relation of one or more of such steps with respect to each of the others and the article possessing the features, properties, and the relation of elements which are exemplified in the following detailed disclosure, and the scope of the application of which will be indicated in the claims.

For a fuller understanding of the nature and objects of the invention, reference should be had to the following detailed description, taken in connection with the accompanying drawing, in which.

This invention contemplates the production of a print, image, design or the like in light-polarizing material or in a light-polarizing surface, and the provision of a process for the production of such a print or image. Light-polarizing surfaces may be produced in many ways. A thin film of light-polarizing material comprising, for example, oriented crystals of a light-polarizing substance such as herapathite or its related alkaloids, may be formed on the surface of any suitable support, such as a glass plate or a reflecting surface, or a film such as is now employed in photograph, or the like. The polarizing surface may comprise a deposit of oriented polarizing crystals, or a single large film-like crystal, or it may comprise a film comprising oriented crystals in a suitable suspending medium, such for example as one of the polarizing films sold under the trade name "Polaroid."

In one form of the present invention such light-polarizing surfaces or areas are subjected to a treatment whereby the polarizing properties of the crystals over predetermined portions of the surface or area are destroyed or altered by subjecting the polarizing surface either to the action of suitable chemicals or to the action of destructive radiation.

In another form of the invention certain predetermined portions of the polarizing surface are removed, leaving upon the support a light-polarizing surface forming the desired print, design or the like.

In a still further modification of the invention the formation of the light-polarizing surface is controlled so that the light-polarizing material covers, in whole or in part, only predetermined portions of the area thereof, these portions forming the desired print, picture or the like.

It will be apparent that with any of these processes the print or design may be formed as either a negative or a positive, i. e., the polarizing area remaining on the support may either form the image or form the background for the image. All such processes and the products thereof are deemed to fall within the scope of this invention.

Figure 1:
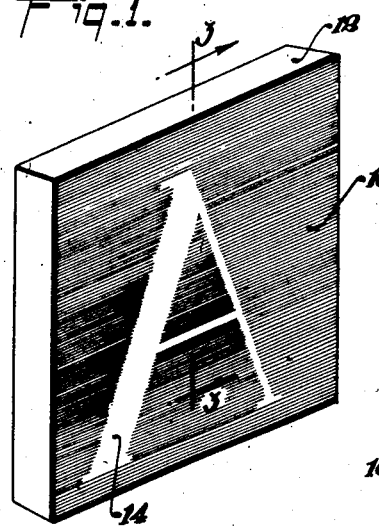
Figure 1 represents diagrammatically in perspective an article embodying one form of the invention.

In Fig. 1 there is illustrated one modification of the invention. 10 represents a light-polarizing surface formed in any desired manner, as for example by the deposit of a crystal or optically oriented crystals of a light-polarizing material such as herapathite upon a supporting element 12, or by the coating of such an element with a suspension of oriented light-polarizing crystals. 14 represents an area or areas having different polarizing properties than the remainder of the polarizing surface. The areas 14 may be non-polarizing or they may polarize transmitted light to differing degrees, and thus be distinguished from the remainder of the surface 10. In one form of the invention 14 may represent areas over which the polarizing surface has been removed, for example by scraping away the deposited crystal or crystals, or by cutting away portions of the polarizing film.

Figure 2:
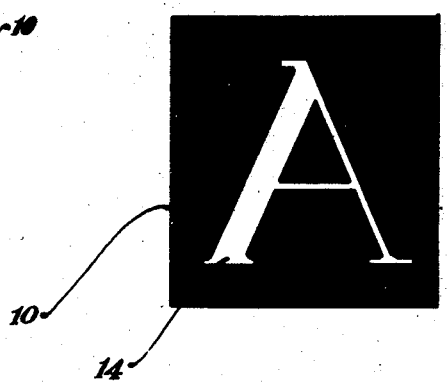
Fig. 2 represents the article when viewed through an analyzer.

The areas over which the polarizing surface has been removed are shown in Fig. 1 as forming a predetermined design or figure. When the product shown in Fig. 1 is viewed in polarized light vibrating in a direction at right angles to the direction of vibration of polarized light transmitted by the surface 10, or when it is viewed through an analyzer so positioned that the polarizing axis of the analyzer is crossed with the polarizing axis of the polarizing surface 10, the areas other than the areas 14 appear dark, as shown in Fig. 2, and those areas 14 with respect to which the light-polarizing material has been removed appear bright and transparent. The design, picture, image or indicia formed in the surface by the removal of the light-polarizing material thus becomes vividly apparent to the observer, although it may be substantially invisible if the device is viewed in ordinary light without an analyzer.

It will be apparent that in such a structure the portions removed may be of any size and shape, and the removal of the polarizing material may be of a character such as to leave a polarizing surface comprising the design, so that when the product of the invention is viewed through an analyzer the design appears dark and the background bright or colorless. Such a device is illustrative of one form of the process of the invention and of the product thereof.

Design-bearing light-polarizing surfaces, such as that heretofore described, may be produced by other, modified processes. The light-polarizing surface may be treated with a solution or paste of the consistency of ink, for example, and of a character adapted to destroy or alter the polarizing properties of the surface. Such a solution may be applied in any way, as by brush strokes, or it may be applied by preparing cuts, such as half-tone cuts, and coating them with the solution, and then printing on the polarizing surface; or a gelatine relief, such as is now employed commercially in motion picture manufacture, may be used, and the solution adapted to destroy the polarizing properties of the polarizing surface may be applied to it. The gelatine relief may then be brought into contact with the polarizing surface. This process may take the form of a continuous printing process. Many materials and solvents may be employed in the processes described.

Suitable solutions for use in such a process where the polarizing surface is formed of a suspension or deposit of crystals of a herapathite-like compound may comprise alcohol solutions, such as methanol solutions, of (1) the alkaloid forming the polarizing surface; for example, if the crystals comprise quinine, this solution may in turn consist of a solution of quinine, whereas if the crystals comprise cinchonidine, the solution may comprise cinchonidine; (2) ammonium hydrosulfide (NH₄SH); (3) sodium iodide (NaI). The action of the solutions or chemical agents in destroying the polarizing properties of the surface may be referred to generally as an alteration in the polarizing properties thereof.

Other solutions may be employed to effect the same result. Those mentioned are illustrative only.

It will be apparent that the degree of destruction of the polarizing properties of the treated surface may be controlled by controlling the quantity of destructive solution applied thereto with respect to each area thereof or by controlling the period of time during which contact is maintained between the solution and the treated areas. Preferred reproductions of photographic negatives, pictures, designs, etc., may be produced in the polarizing surface by following the technique described above.

Care should be taken to insure that the solvent or destructive substance applied to the surface be limited in its action to the area to which it is applied, i. e., that it be not so fluid as to flow freely over the surface to which it has been applied, and to this end the remaining portions of the surface may be covered with a thin protective coating, as of paraffin, while the exposed areas are subject to attack. Such an arrangement has been found particularly desirable when the exposed areas are subjected to the action of a gas, such as ammonia vapor.

The polarizing properties of the surface in which the picture or image is to be formed may be destroyed by subjecting the surface to the action of destructive radiation. For example, a thin film of the Polaroid type comprising a suspension of herapathite-like crystals in a light-transmitting medium comprising a cellulose nitrate base may suffer loss of polarization upon exposure to an intense ultraviolet radiation. A surface comprising such a film and exposed over predetermined areas to such radiation may be employed in the production of one form of the product of the present invention. It will be apparent that the degree of radiation to which each area of the film may be subjected may be controlled by the use of suitable filters, etc., and that the film as a whole, after treatment by the ultra violet radiation, may be protected from further deterioration by coating with a suitable material adapted to block ultra violet radiation.

Figure 3:
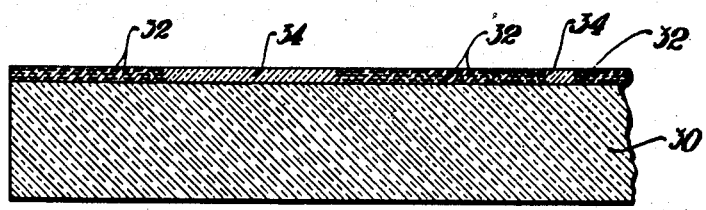
Fig. 3 is a view in section of the article shown in Figs. 1 and 2 along line 3—3 of Fig. 1.

In every case the process may be employed in the prodoction of either a negative or a positive, i. e., the polarizing surface left intact may constitute the image itself or the background for the image. Where the polarizing properties of the polarizing surface are destroyed or altered without removal of the material forming the surface, the article may take the form shown in section in Fig. 3, where 30 represents a supporting plate or film, 32 those portions of the polarizing surface which have not been acted upon, and 34 those portions of the surface which have had their polarizing properties altered.

In a still further modification of the invention light-polarizing material may be deposited upon a suitable support, so as to cover only predetermined portions thereof, these portions forming the desired image. For example, light-polarizing material may be applied to a printing wheel in such a manner that the polarizing particles within the suspension forming the light-polarizing material may be oriented upon the surface of the wheel. This may be accomplished by causing the wheel to pass beneath a succession of plates or similar elements so as to smear the deposited polarizing film uniformly in one direction upon the surface of the printing wheel. The wheel may be formed with indentations comprising the desired design, and may be forced into contact with a suitable supporting plate or element coated with a substance adapted to adhere to the deposited polarizing material and strip it from the printing wheel, or the polarizing material may be printed from the wheel directly upon the support, much in the manner in which ink is printed.

Figure 4:
Fig. 4 is a view similar to Fig. 1 showing a product embodying another form of the invention.

Any suitable substance may, in any case, be employed as the support. Thin translucent paper may be used satisfactorily, or the support may be of glass, or plastic film as, for example, a film of a resin or synthetic resin, or the support may be opaque and reflecting, such as a mirror, or metallic foil, or the like. Furthermore, where the material forming the polarizing surface is itself of sufficient strength to make a support unnecessary, as where a film of the above-mentioned type sold under the trade name "Polaroid" is used, no other support is required, as is shown in Fig. 4.

It will be apparent that the process of the present invention may be performed in a continuous fashion. For example, a strip of film such as that employed in photography, may be coated with a polarizing film or layer by smearing upon the film a suspension of needle-shaped polarizing particles in a suitable transparent suspending medium, so as to orient the particles in the suspension. This deposit may comprise an exceedingly thin layer, for example a layer not exceeding .0003 of an inch on the surface of the suporting film. The suspension suitable for the deposit of such a layer may comprise herapathite-like particles comprising cinchonidine in a suspending medium comprising the vinyl compound sold commercially under the trade name "Vinylite X."

The gelatine relief process heretofore described may be then employed to print continuously upon the deposited film a series of images, pictures, designs or the like, for example such a series of prints as is used in connection with motion picture projection. The film with the coated polarizing surface and the images formed therein, through the destruction or alteration in the polarizing properties of certain portions thereof, may then if desired be employed in connection with the projection upon a suitable non-depolarizing viewing screen of images in polarized light which are substantially invisible unless the screen is viewed through a suitable analyzer.

The term "design" in this specification and appended claims is intended to be generic and to include, among other things, a design, picture, image, indicium, mark, token, print, etc., whether as a positive or a negative.

Since certain changes in carrying out the above process, and certain modifications in the article which embody the invention may be made without departing from its scope, it is intended that all matter contained in the above description or shown in the acompanying drawing shall be interpreted as illustrative and not in a limiting sense.

Having described my invention, what I claim as new and desire to secure by Letters Patent is:

1. A method comprising forming a surface of light-polarizing material having substantially uniform light-polarizing properties and altering the polarizing properties of certain areas of said surface by subjecting said areas to the action of an agency destructive of the polarizing properties thereof to form a design therein.

2. A method comprising forming a surface of light-polarizing material having substantially uniform light-polarizing properties and altering the polarizing properties of certain areas of said surface, by subjecting said areas to radiation destructive of the polarizing properties thereof, to form a design therein.

3. A method comprising forming a surface of light-polarizing material having substantially uniform light-polarizing properties and altering the polarizing properties of certain areas of said surface, by subjecting said areas to the action of a chemical destructive of the polarizing properties thereof, to form a design therein.

4. A method comprising forming a surface of light-polarizing material having substantially uniform light-polarizing properties and applying to certain areas of said surface a solution destructive of the polarizing properties thereof.

5. A method comprising forming a surface of light-polarizing material having substantially uniform light-polarizing properties and altering the polarizing properties of certain areas of said surface by applying thereto a material destructive of the polarizing properties thereof and simultaneously protecting the remainder of said surface from contact with said material.

6. A method comprising forming a light-polarizing surface comprising oriented crystals of a light-polarizing material and forming a design therein by destroying the polarizing properties of certain of said crystals while maintaining the material forming said crystals in situ.

7. A method comprising forming a light-polarizing surface comprising oriented crystals of a light-polarizing material and forming a design therein by dissolving certain of said crystals.

8. A method comprising forming a light-polarizing surface comprising oriented crystals of a light-polarizing material and forming a design therein by dissolving certain of said crystals in a solution containing some of the material of said crystals.

9. A method comprising forming a surface of light-polarizing material having substantially uniform light-polarizing properties and substantially destroying the polarizing properties of certain areas of said surface by applying to the material comprising said areas, while maintaining said material in situ, an agency destructve of the polarizing properties of said material.

10. A light-polarizing image for viewing purposes comprising a relatively thin, transparent layer of a plastic material, certain predetermined portions of said layer comprising means adapted to polarize predeterminedly light transmitted thereby, certain other predetermined portions of said layer comprising means adapted to transmit not only light transmitted by said first-mentioned portions but light blocked by said first-mentioned portions, all of said portions being so arranged in said layer as to provide in polarized light vibrating at right angles to the direction of vibration of light transmitted by said first-mentioned portions a predetermined design.

11. A light-polarizing image for viewing purposes comprising a relatively thin, transparent layer of a plastic material, certain predetermined portions of said layer comprising means adapted to polarize predeterminedly light transmitted thereby, certain other predetermined portions of said layer comprising means adapted to transmit not only light transmitted by said first-mentioned portions but light blocked by said first-mentioned portions, all of said portions being so arranged in said layer as to provide in polarized light vibrating at right angles to the direction of vibration of light transmitted by said first-mentioned portions a predetermined design, said layer being of substantially uniform thickness throughout all of said portions.

12. A light-polarizing image for viewing purposes comprising a supporting element having bonded thereto a relatively thin, transparent layer of a plastic material, certain predetermined portions of said layer comprising means adapted to polarize predeterminedly light transmitted thereby, and other predetermined portions of said layer comprising means adapted to transmit light vibrating in any direction, all of said portions being so arranged in said layer as to form a predetermined design in polarized light vibrating at right angles to the direction of vibration of light transmitted by the first-mentioned portions of said layer.

13. A light-polarizing image for viewing purposes comprising a transparent supporting element, areas thereon comprising dichroic means adapted to polarize predeterminedly light transmitted thereby, and other areas thereon comprising means adapted to transmit light vibrating in any direction, said areas being so positioned as to form a predetermined design in polarized light vibrating at right angles to the direction of vibration of light transmitted by said first-mentioned areas.

14. A light-polarizing image for viewing purposes comprising a reflecting, opaque supporting element, areas thereon comprising dichroic means adapted to polarize predeterminedly light transmitted thereby, and other areas thereon comprising means adapted to transmit light vibrating in any direction, said areas being so positioned as to form a predetermined design in polarized light vibrating at right angles to the direction of vibration of light transmitted by said first-mentioned areas.

15. A light-polarizing image for viewing purposes comprising a translucent, paper supporting element, areas thereon comprising dichroic means adapted to polarize predeterminedly light transmitted thereby, and other areas thereon comprising means adapted to transmit light vibrating in any direction, said areas being so positioned as to form a predetermined design in polarized light vibrating at right angles to the direction of vibration of light transmitted by said first-mentioned areas.

16. A light-polarizing image for viewing purposes comprising means providing a surface comprising a multiplicity of areas, each comprising means adapted to substantially block light predeterminedly polarized, said surface comprising other areas each adapted to transmit to a predetermined extent light vibrating in any direction, all of said areas being so positioned as to form a predetermined design in said light, and all of said areas being adapted to transmit light differently polarized.

17. A light-polarizing image for viewing purposes comprising a sheet of a plastic material of substantially uniform thickness, predetermined spaced portions of said sheet comprising dichroic means adapted to block substantially all light vibrating in a predetermined manner, and adapted to transmit light vibrating differently, other portions of said sheet being adapted to transmit light vibrating in any direction, said spaced portions being positioned within said sheet to form a predetermined design.

18. A light-polarizing image for viewing purposes comprising a supporting element, areas thereon comprising means adapted to polarize predeterminedly light transmitted thereby and other areas thereon comprising means adapted to transmit light vibrating in any direction, said first-mentioned areas being so positioned as to form a predetermined design in polarized light vibrating at right angles to the direction of vibration of light transmitted by said first-mentioned areas, there being a multiplicity of said first-mentioned areas, each of said first-mentioned areas comprising a multiplicity of optically oriented light-polarizing particles.

19. A light-polarizing image for viewing purposes comprising a supporting element, areas thereon comprising means adapted to polarize predeterminedly light transmitted thereby and other areas thereon comprising means adapted to transmit light vibrating in any direction, said first-mentioned areas being so positioned as to form a predetermined design in polarized light vibrating at right angles to the direction of vibration of light transmitted by said first-mentioned areas, there being a multiplicity of said first-mentioned areas, each of said first-mentioned areas comprising a multiplicity of optically oriented light-polarizing particles in a light-transmitting plastic and certain of said other areas comprising said plastic and being substantially free from said particles.

20. A light-polarizing image for viewing purposes comprising a sheet of a light-transmitting plastic having light-polarizing material distributed therethrough, differing areas of said sheet polarizing transmitted light to predetermined different degrees, said areas being so arranged in said sheet as to provide a predetermined light-polarizing image, all of the polarizing material within said sheet being oriented with its polarizing axes in substantial parallelism.

21. A light-polarizing image for viewing purposes comprising a sheet of a light-transmitting plastic having light-polarizing material distributed therethrough, differing areas of said sheet polarizing transmitted light to predetermined different degrees, said areas being so arranged in said sheet as to provide a predetermined light-polarizing image, all of the polarizing material within said sheet being oriented with its polarizing axes in substantial parallelism, the thickness of said sheet over the area comprising said image being substantially uniform.

EDWIN H. LAND.